United States Patent [19]
Jeng

[11] Patent Number: 5,140,944
[45] Date of Patent: Aug. 25, 1992

[54] FEEDING DEVICE HAVING MEANS TO RELEASE FEED FROM WITHIN AT PRE-ARRANGED INTERVALS

[76] Inventor: Jieh-Chin Jeng, No. 8, Lane 732, Chung-Cheng Rd., Yung-Kang Hsiang, Tainan Hsien, Taiwan

[21] Appl. No.: 781,823

[22] Filed: Oct. 23, 1991

[51] Int. Cl.⁵ .................... A01K 5/02; A01K 61/02
[52] U.S. Cl. ................... 119/51.11; 119/51.04; 222/650; 222/58
[58] Field of Search ............. 119/51.11, 51.04, 51.13; 222/650, 638, 58, 39, 362, 370

[56] References Cited

U.S. PATENT DOCUMENTS

| | | | |
|---|---|---|---|
| 2,865,447 | 12/1958 | Kaufman | 119/51.11 |
| 3,050,029 | 8/1962 | Appleton | 119/51.13 |
| 3,276,630 | 10/1966 | Welch | 222/362 |
| 3,340,851 | 9/1967 | Frank et al. | 119/51.13 |
| 4,044,920 | 8/1977 | Swartzendruber | 222/58 |
| 4,422,409 | 12/1983 | Walker et al. | 119/51.11 |
| 4,676,399 | 6/1987 | Burckhardt | 222/370 |

FOREIGN PATENT DOCUMENTS

| | | | |
|---|---|---|---|
| 593605 | 12/1977 | Switzerland | 119/51.04 |
| 1364260 | 1/1988 | U.S.S.R. | 119/51.04 |

Primary Examiner—Paul J. Hirsch
Assistant Examiner—Todd E. Manahan
Attorney, Agent, or Firm—Ladas & Parry

[57] ABSTRACT

A casing has a rotary plate which divides the casing into an upper portion and a lower portion and a driving unit to rotate the rotary plate. The rotary plate has a first opening formed through it. The upper portion has a container holding a feeding stock and the lower portion has a top plate with a second opening through it. The container has an outlet which aligned with the first opening of the rotary plate when the rotary plate is rotated to a first position and a second position where the first opening of the rotary plate is aligned with the second opening of the top plate of the lower portion.

4 Claims, 4 Drawing Sheets

FEEDING DEVICE HAVING MEANS TO RELEASE FEED FROM WITHIN AT PRE-ARRANGED INTERVALS

BACKGROUND OF THE INVENTION

1. Field of the Invention

This invention relates to a feeding device, more particularly to a feeding device which does not need a person to attend to it daily yet which can automatically let out a feed stored therein at pre-set intervals.

2. Description of the Related Art

Breeding pets, such as birds in a cage or fishes in an aquarium, for recreation and as a hobby is increasingly popular among city dwellers. Some pets need careful attention, such as punctual and accurately proportional feedings and regular change and circulation of the water in an aquarium. However, pet breeders often forget to do these things for various reasons, such as travel to a distance place or due to mere forgetfulness. As a result, the pets can become ill or die of hunger.

SUMMARY OF THE INVENTION

It is the main object of the present invention to provide a feeding device to be used in breeding pets which device does not need a person to attend to it personally but which can automatically release feed stored within at pre-set intervals.

Accordingly, the feeding device of the present invention includes a casing which has an upper portion with a container to receive feed therein and a lower portion with a top plate which has a first opening extending through the lower portion. The container has an outlet formed at the bottom of the same adjacent to the top plate of the lower portion. The lower portion includes a mounting shaft extending vertically therein, and a rotary plate is rotatably mounted to the mounting shaft above the top plate which seals the first opening of the top plate of the lower portion in a normal condition. The rotary plate includes a second opening formed therethrough, off set from the axis of rotation and substantially equal to the first opening of the top plate in size. The casing also includes a driving means to rotate the rotary plate and a device to actuate the driving means in a timely fashion so as to rotate the rotary plate an angular distance between a first position where the second opening of the rotary plate is in communication with the outlet of the feed container and a second position where the second opening of the rotary plate is in communication with the first opening of the top plate of the lower portion.

BRIEF DESCRIPTION OF THE DRAWINGS

Other features and advantages of the present invention will become apparent in the following detailed description, including drawings, all of which show a non-limiting form of the invention, and of which.

DETAILED DESCRIPTION OF THE PREFERRED EMBODIMENT

Figure 1:
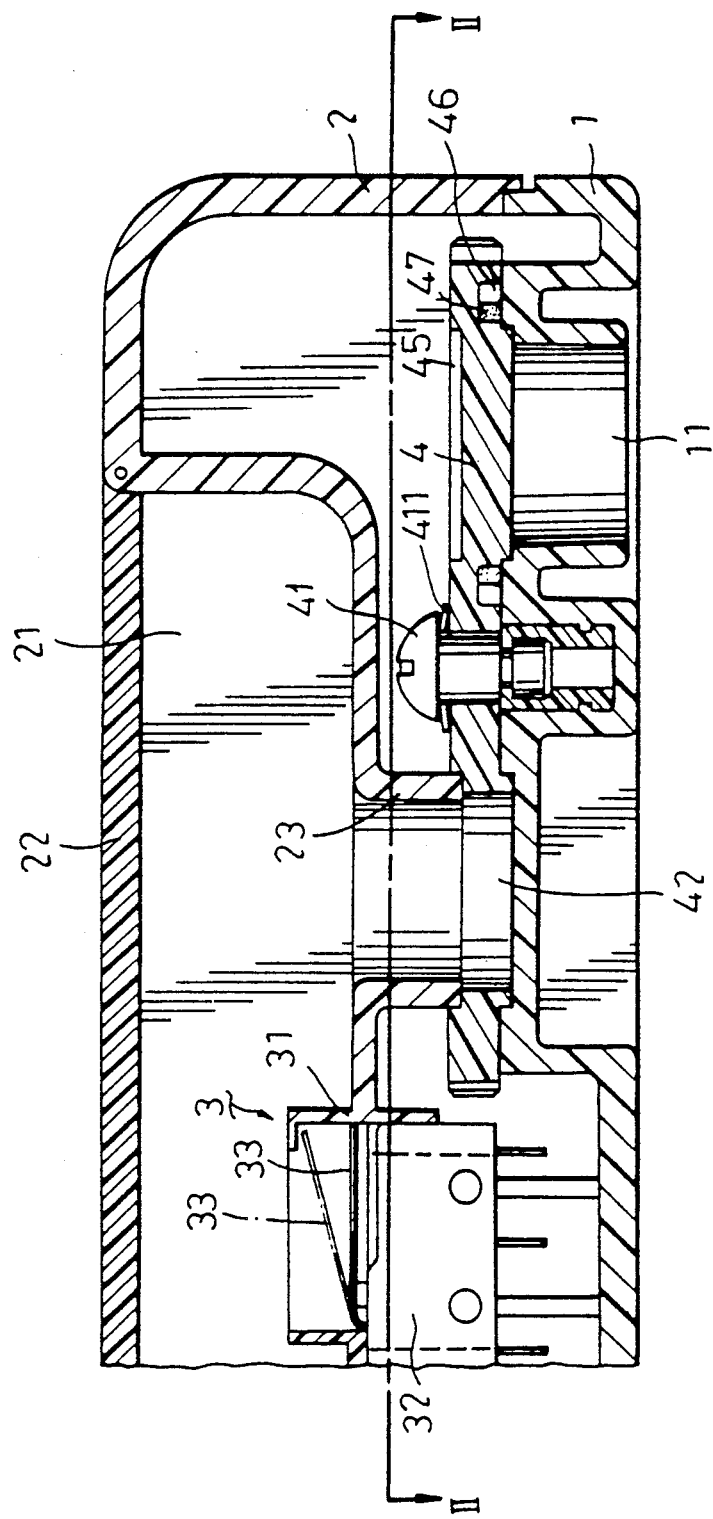
FIG. 1 shows a fragmentary cross sectional view of a feeding device of the present invention.

Referring to FIG. 1, a fragmentary view of a feeding device of the present invention is shown to include a casing composed of an upper portion (2) and a lower portion (1).

The upper portion (2) includes a container (21) having a receiving space to receive feed therein and a lid (22) pivotally provided and covering said container (21). The container (21) has an outlet (23) formed at a bottom of the same adjacent to the lower portion (1). The container (21) also includes a weighting unit (3) formed adjacent to the outlet of the same which includes a hollow space (31) wherein a resilient plate (33) and a micro switch (32) in association with the resilient plate (33) are provided. When the feed is full in the receiving space of the container (21), the resilient plate (33) is compressed downward by the weight of the feed so that the micro switch (32) to which an alarm system is installed to detect the weight of the feed in the container (21) will not give out a warning signal. The arrangement to give out the warning signal upon detection of a certain weight is a known art, a detailed description of which is not necessary here. Upon detecting that the feed in the container (21) needs refilling, that is, the feed is less than it normally should be, the resilient plate (33) will pop up, as shown by perforated lines in FIG. 1, connecting a circuit so that the warning signal is given out. The warning signal can either be a sound or a light. The pets' owner person then realizes that it is time to refill the feed in the container (21).

The lower portion (1) has a top plate (not numbered) with a first opening (11) extending through the lower portion (1) of the casing. Since a mounting shaft (41) extends vertically in the lower portion (1), a rotary plate (4) is mounted to the vertical shaft (41) above the top plate of the lower portion in such a manner that the rotary plate (4) shields the first opening (11) of the top plate in a normal condition. The rotary plate (4) has a curved portion (45) on an upper side of the same with a bottom recess where a second opening (42) is formed through the bottom recess. The second opening (42) is substantially equal to the first opening (11) of the top plate in size. The curved portion (45) confines an angular distance within which the second opening (42) travels, a detailed explanation will follow later.

It is important to observe that the rotary plate (4) is substantially thick that the second opening (42) has a substantial depth thereof that it can only receive a substantial amount of feed therein when the second opening is aligned with the outlet of the container. A compression means (411), such a compression spring, is provided around to the vertical shaft (41) above the rotary plate (4) in such a manner that the compression means press the rotary plate (4) against the top plate of the lower portion (1) so that the rotary plate (4) can rotate on the top plate in a balanced manner. On a lower side of the rotary plate (4), there is a seal retaining grooved recess (46) looped around the second opening (42) which has an angular distance substantially equal to the angular distance within which the second opening (42) travels between a first and second portion, a detailed description of which is given in the following. An O-shaped rubber ring (47) is provided in the seal retaining grooved recess (46) so that it seals the first opening (11) of the top plate in a water tight relationship when the second opening (42) of the rotary plate (4) is not aligned with the first opening (11) of the top plate of the lower portion (1). This is necessary because some feed may soften when in the vicinity of water, such as when the casing is hung on the top of an aquarium, where humidity is bound to be plentiful.

The rotary plate (4) further has two spaced projections (431,432), each extending radially and outwardly from the periphery of the same, and a toothed section (44) is also formed on the periphery, the reasons for which will be described hereinafter.

The casing further has a driving means (5), such as a motor (51) including a shaft (511) and rotation speed reducing gear wheels (53, 52), one of which is meshed with the toothed section (44) of the rotary plate (4) while the other one is in association with the shaft (511) of the driving means. The driving means (51) is pre-arranged to be actuated at different interval, such as at 12 hour intervals, by a known art. A sensing unit (54) which has a clearance (541) between a first and a second prong (542, 543), is provided on the topmost section of the lower portion. The first prong is a light giving element, and the second prong is a light receiving element.

Figure 2:
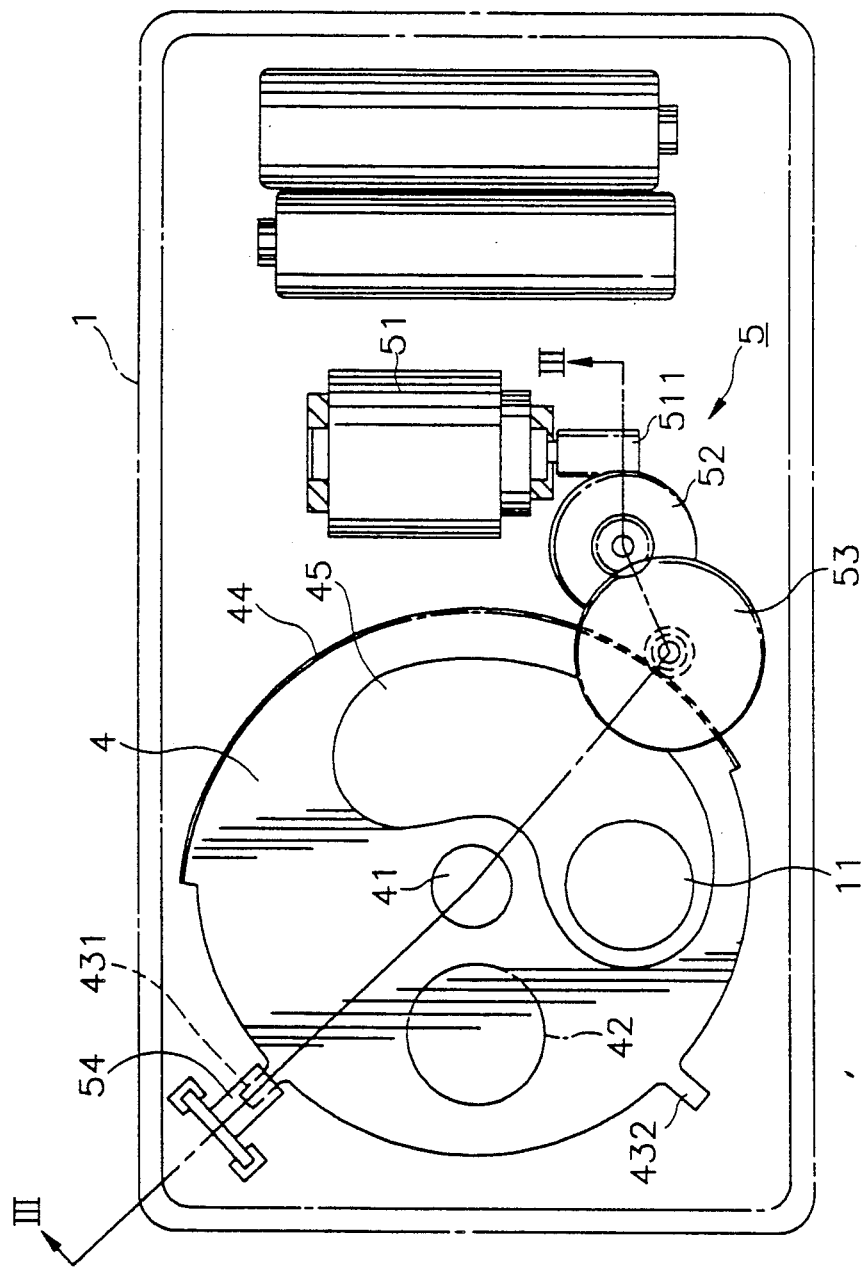
FIG. 2 shows a top view of the feeding device of the present invention taken along the line II—II.
Figure 3:
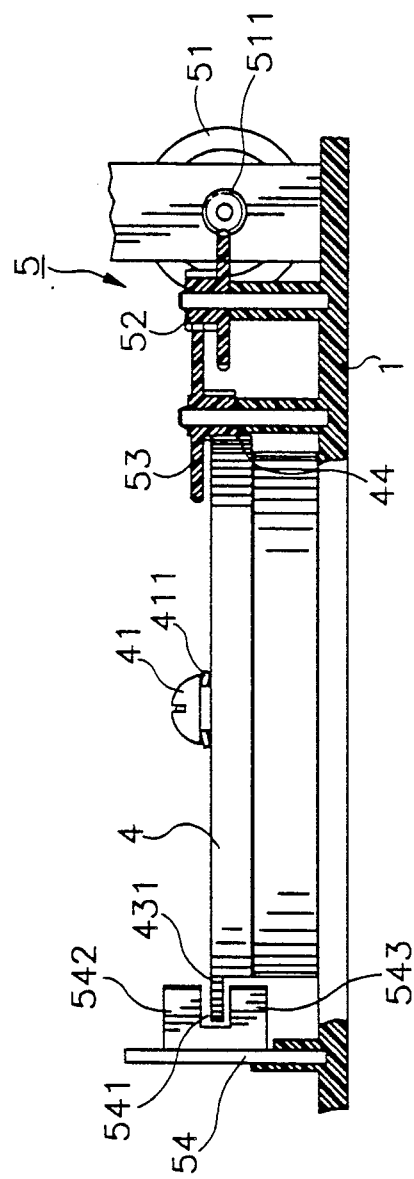
FIG. 3 shows a cross sectional view of FIG. 2 taken along the line III—III.

When the driving means (51) is actuated at the preset time, the rotary plate (4) is rotated an angular distance to a first position where the second opening (42) of the rotary plate (4) is aligned with the outlet (23) of the container (21) to receive the feed, shown by perforated lines in FIG. 2. During that time, the projection (431) of the rotary plate (4) is in the clearance (541) of the sensing unit (54), shielding the light emitting prong (542) from the light receiving prong (543). Thus the sensing unit (54) will give a signal ordering the driving means (51) to rotate the rotary plate (4) in a reverse direction, where the second opening (42) of the rotary plate (4) is aligned with the first opening (11) of the top plate of the lower portion (1) to let out the feed therefrom. The occurrence is repeated, so that the feeding device of the present invention does not need an individual attention but can still feed a pet automatically and punctually.

Figure 4:
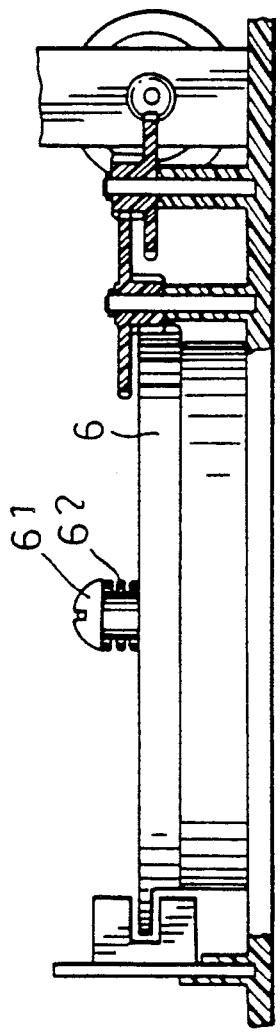
FIG. 4 shows another preferred embodiment of the feeding device of the present invention.

Referring to FIG. 4, in one preferred embodiment of the invention, a compression spring (62) is mounted at the top of the vertical shaft (61) so as to urge the rotary plate (6) to abut against the top plate of the lower portion in a balanced manner. The feature and the objects are the same as those of the preceding embodiment.

With the invention thus explained, it is obvious to those skilled in the art that various modifications and variations can be made without departing from the scope and spirit of the present invention. It is therefore intended that this invention be limited only as in the appended claims.

I claim:

1. A feeding device comprising:
    a casing including an upper portion with a container to receive feed therein, said container having a bottom with an outlet, and a lower portion with a top plate adjacent to and shielding the outlet of said (container) from said lower portion, said top plate having a first opening extending through said lower portion;
    a weight measuring unit provided adjacent to the bottom of said container, said weight measuring unit having a micro switch which gives out a warning signal upon measuring a weight of said feed less than a pre-determined weight amount in said container;
    a mounting shaft extending vertically in said lower portion and a rotary plate being rotatably mounted to said mounting shaft above said top plate of said lower portion and normally covering the first opening of said top plate, said rotary plate having a second opening formed therethrough offset from the axis of the mounting shaft and substantially equal to the first opening of said top plate in size;
    means for driving said rotary plate; and
    means for controlling said driving means at a predetermined time interval to rotate said rotary plate an angular distance between a first position where the second opening of said rotary plate is in communication with said outlet of said container of said upper portion and a second position where the second opening of said rotary plate is in communication with the first opening of said top plate of said lower portion; and
    wherein said rotary plate further includes a first protrusion and a second protrusion spaced from the first protrusion, each of which extends radially and outwardly from the periphery of said rotary plate and a toothed section formed along the periphery of said rotary plate and spaced from the first and second protrusions, said driving means further including a rotation speed reducing gear means meshed with said toothed section of said rotary plate and in association with said driving means; said controlling means further including a sensing unit provided on a topmost section of said lower portion; and said sensing unit having a clearance therein through which the first and second protrusions of said rotary plate pass.

2. A feeding device as claimed in claim 1, wherein said rotary plate further includes a seal retaining grooved recess formed on a lower side of said rotary plate, said seal retaining grooved recess being concentrically disposed around said second opening of said rotary plate and into which an O-shaped ring is inserted which seals said first opening of said top plate of said lower portion in a water tight relationship when said rotary plate is at said first position.

3. A feeding device as claimed in claim 1, wherein said casing further includes a compression means provided around said mounting shaft and above said rotary plate to compress said rotary plate against said top plate of said lower portion.

4. A feeding device as claimed in claim 3, wherein said compression means is a compression spring.

* * * * *